(Model.)

3 Sheets—Sheet 1.

T. B. ELLIS.
CORN PLANTING MACHINE.

No. 248,297.  Patented Oct. 18, 1881.

Witnesses
Fred. G. Dieterich
P. C. Dieterich

Inventor
T. B. Ellis
By Dodgeron
Atty's (Model.)

T. B. ELLIS.
CORN PLANTING MACHINE.

No. 248,297. Patented Oct. 18, 1881.

Witnesses:
Fred G. Dieterich
P. L. Dieterich

Inventor:
T. B. Ellis
By Dodge & Son
Attys.

(Model.)
T. B. ELLIS.
CORN PLANTING MACHINE.
No. 248,297.  Patented Oct. 18, 1881.
Fig. 5.  Fig. 6.
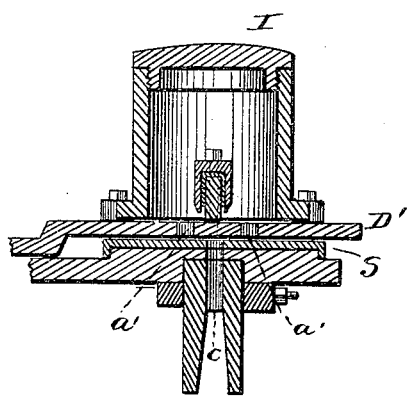 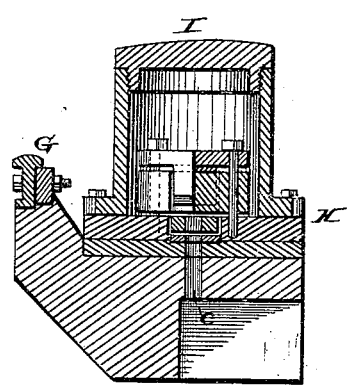
Fig. 7.  Fig. 8.
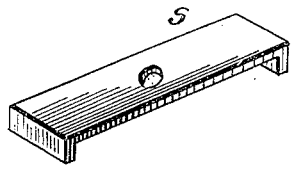 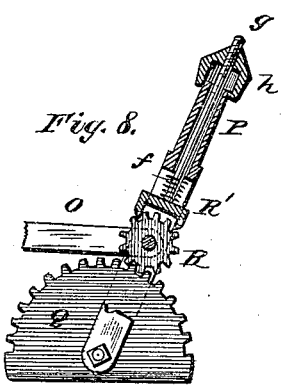
Witnesses:
Fred G. Dieterich
P. C. Dieterich
Inventor:
T. B. Ellis
By Dodge & Son
Attys.

UNITED STATES PATENT OFFICE.

THOMAS B. ELLIS, OF DAYTON, WISCONSIN.

CORN-PLANTING MACHINE.

SPECIFICATION forming part of Letters Patent No. 248,297, dated October 18, 1881.

Application filed February 18, 1881. (Model.)

*To all whom it may concern:*

Be it known that I, THOMAS B. ELLIS, of Dayton, in the county of Green and State of Wisconsin, have invented certain Improvements in Corn-Planting Machines, of which the following is a specification.

This invention relates to that class of machines in which a reciprocating slide discharges the corn through the heel of a runner into a furrow opened by the latter; and it consists in various features of novelty and various combinations and arrangement of devices, whereby I produce a machine adapted to plant three rows, dropping either automatically or at the will of the attendant, and either adapted to plant the corn in check-rows or in drills, as may be required.

Figure 1:
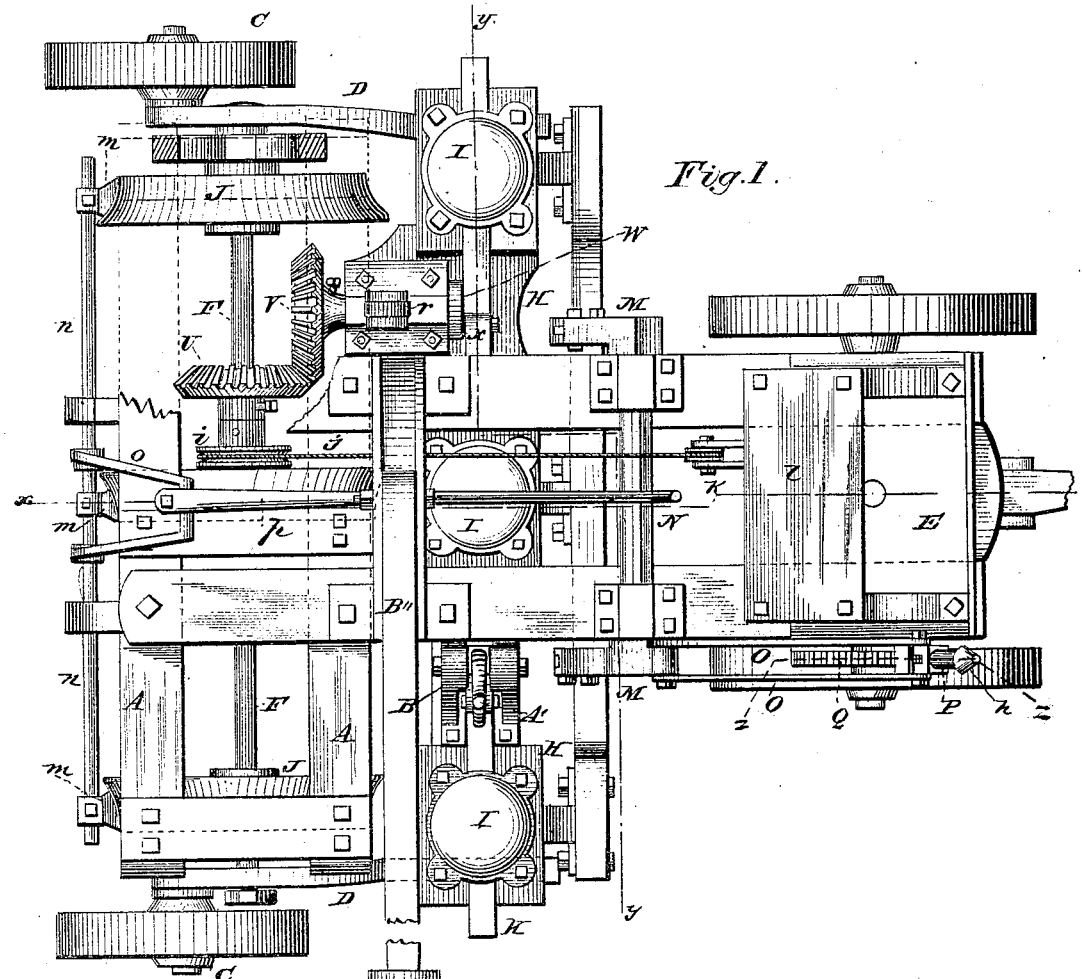
Figure 4:
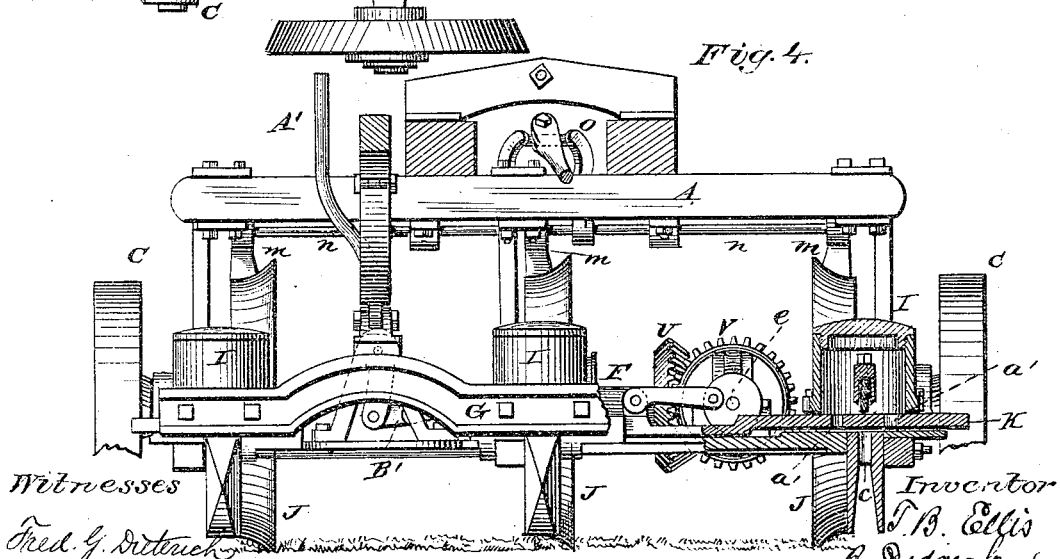
Figure 2:
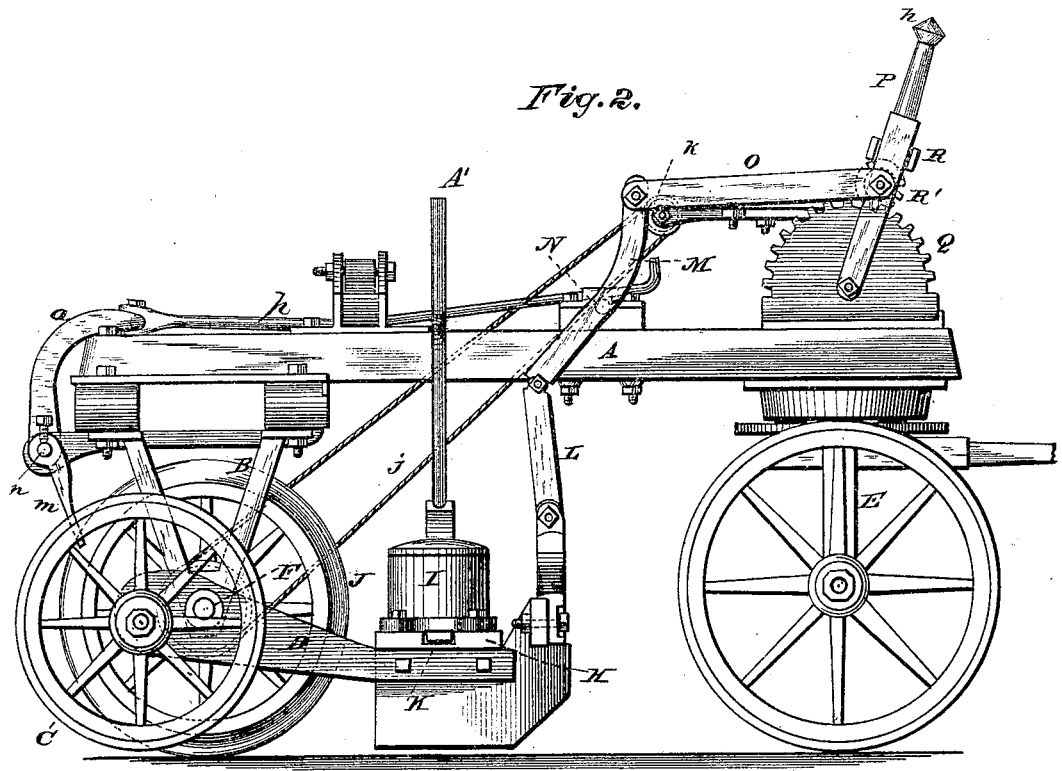
Figure 3:
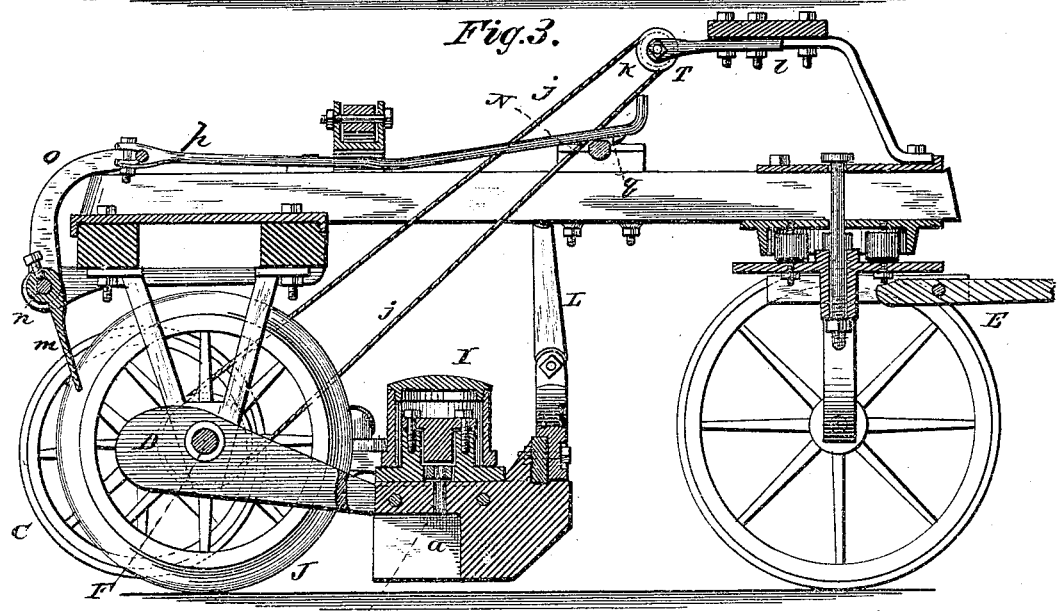

Referring to the accompanying drawings, Figure 1 represents a top-plan view of my machine, a portion of the main frame (indicated by dotted lines) being broken away in order to expose the parts located thereunder. Fig. 2 is a side elevation of the machine; Fig. 3, a longitudinal vertical section of the same on the line $x\ x$, Fig. 1; Fig. 4, a vertical cross-section of the same on the line $y\ y$, Fig. 1; Fig. 5, an enlarged cross-section of one of the feed-hoppers and the attendant parts transversely of the machine; Fig. 6, a section of the hopper at right angles to that shown in the preceding figure, with the guard or cut-off therein shown in elevation at one end and in section at the other; Fig. 7, a perspective view of one of the removable plates used to change the amount of corn deposited by the slide; Fig. 8, a vertical section on the line $z\ z$ of Fig. 1, illustrating the devices by which the runner-operating lever is fastened.

A represents the horizontal main frame, consisting, essentially, of two longitudinal beams, having two transverse beams bolted rigidly across their rear ends. The rear end of the frame is provided with three depending brackets, B, the lower ends of which are mounted on a transverse shaft, F, which latter carries three wheels or disks, J, intended to serve the double purpose of sustaining the rear end of the machine when in action, and of forcing the earth into the furrows to cover the corn therein. As shown in the drawings, the disks J are beveled or rounded on one side or edge, whereby one edge is caused to cut squarely into the ground, while the other (a beveled edge) serves to force the earth inward toward the furrow. As a means of sustaining the rear end of the machine when not in action, of gaging the distance to which the disks J enter the ground, and of elevating said disks above the ground when the machine is to be turned or transported to and from the field, I provide the rear end of the machine with two wheels, C, mounted on the rear ends of arms or levers D, which latter are in turn mounted loosely upon the outer ends of the cross-shaft F, as clearly represented in Figs. 1 and 2, so that upon elevating the forward ends of arms D their rear ends will be depressed until the wheels C bear upon the ground, after which, by continuing the motion of the levers, the wheels C serve as fulcrums for the levers, which latter then serve to raise the shaft F and wheels J. The forward end of the main frame is sustained by a truck or carriage, E, pivoted thereunder, the truck consisting, as shown, of an arched axle, having traction-wheels on its two ends, and having a tongue attached as a means of connecting the draft-animals.

To the forward ends of the levers D, I secure a transverse plate, H, which serves to support the hoppers and the dropping devices to a third arm, D, similar to those at the sides of the machine, being also mounted in the middle of the machine, to give the parts additional strength.

The dropping mechanism consists, essentially, of three runners to open the furrows, of seed-hoppers mounted upon the respective runners, and of a transverse reciprocating slide, by which the corn is delivered from the hoppers into and through the heels of the runners. The three runners $a$ are bolted securely to the forward ends of the respective arms or levers D, and are connected with each other by means of a transverse bar or beam, G, bolted firmly to their forward ends, as clearly represented in the drawings, whereby all the runners are connected rigidly and caused to rise and fall in unison. Upon and across the three runners I bolt firmly a bed-plate, H, provided with a longitudinal groove, in which the reciprocating feed-slide K is mounted, as shown. Upon the plate H, above the feed-slide, over the respective runners, I bolt firmly the feed-hoppers I. The feed-slide K is provided in each hopper with two feed openings or pockets, $a'$, so arranged as to be brought alternately over a discharge-opening, $c$, extending downward through the bed-plate H, directly above the opening $c$. There is located in each hopper a cut-off or guard, D, the purpose of which is to prevent the corn from escaping except as it may be carried beneath the guard and over the feed-opening by the cells and the slide. As the slide is reciprocated each cell is carried outward from beneath the guard and filled with corn from above, and then passed beneath the guard and its charge of corn permitted to escape through the opening $c$ into the furrow, the two cells being filled and discharged alternately.

As a means of reciprocating the feed-slide automatically I mount on the plate H a rotary shaft, $e$, provided at one end with a crank-wheel, W, connected to a pitman joined to the reciprocating slide. The crank-shaft $e$ is provided at its rear end with a beveled gear, V, engaging with and driven by a corresponding wheel, U, on the cross-shaft F, to which the furrow closing or covering wheels J are secured. When the machine is in operation the wheels J are turned by their traction upon the ground and serve to rotate the shaft F, which transmits motion through the beveled wheels, and their connection serves to reciprocate the feed-slides, and thus the machine is caused to drop the corn automatically at regular intervals. The frequency with which the corn is dropped may be varied as desired by substituting a larger or smaller gear-wheel in the place of the one marked V, the wheel U being adjustable endwise upon the shaft, in order that it may be adjusted to companion wheels of different sizes.

In some cases it may be desirable to operate the feeding devices by hand, and for this purpose I provide the machine, as shown, with an upright hand-lever, A', mounted in standards on the plate H, and connected at its lower end with the slide by means of a link, B', as shown in Figs. 1 and 4. It will, of course, be understood that when the hand-lever is employed the pitman connecting with the crank will be disconnected.

As a means of controlling the depth to which the runners and the furrow-closing wheels enter the ground and of throwing them out of action when the machine is to be turned or transported to and from the field, I connect to the forward end of the runner-frame links L, the upper ends of which are attached to crank-arms M on the ends of a transverse rock-shaft N, mounted on top of the main frame, one of the arms M being extended upward above the rock-shaft to receive links O, the forward ends of which are pivoted to an upright end of the lever P, arranged in position to be operated by the driver. The lever P is pivoted to a sector-plate, Q, the edge of which is toothed or notched to engage with the locking devices described below. These locking devices consist, essentially, of a pinion, R, mounted in the lever P and engaging with the teeth of plate Q, and of a locking-slide, R', mounted on the lever and arranged to engage with the tooth of the pinion.

As shown in Fig. 8, the slide R' is urged downward by a spring, $f$, to keep it in contact with the pinion, and is provided with a stem or spindle, $g$, extended upward through the lever and attached to a handle or cap, $h$, on the upper end of the same. When the parts are in their normal positions the spring holds slide R' in contact with the pinion R, and the latter, being thereby prevented from rotating and engaging in turn with the sector-plate, prevents the end lever from moving. The attendant, grasping the knob or cap $h$, lever in one hand, and raising the same, thereby lifts the slide from the pinion, disengaging the latter and unlocking the lever, which may then be moved by the same hand. The parts are again locked automatically as soon as released. By moving the lever forward and backward the rock-shaft is operated and its crank-arms M caused to raise or lower the runners $a$ and the forward ends of the levers D, to which they are secured. In this way the runners may be raised or lowered with a positive action and secured firmly at any desired point. The act of lowering the runners serves also to raise the supporting-wheels C in relation to the furrow-closing wheels J, thereby permitting the latter to enter the ground to the required depth. The parts being properly adjusted for operation, the wheels C will not encounter the surface of the ground until the wheels J have reached the proper depth; but as soon as this occurs the wheels C, striking the surface of the ground, serve as guards to prevent wheels J from sinking too deeply. When the runners are elevated by means of the hand-levers the forward ends of levers D are raised, thereby depressing the wheels C in relation to the furrow-closing wheels, causing the entire weight of the rear end of the machine to be received upon the wheels C, and lift furrow-closing wheels J clear of the ground. When the machine is to be used for check-rowing purposes this elevation of the wheels J above the ground becomes important in that it admits of the wheels being turned freely, so as to bring the parts in proper position to drop the corn at the exact point required.

In practice it frequently happens that the automatic devices drop the corn between, instead of upon, the check-rows, and it becomes necessary that they should be adjusted to cause them to drop at the proper points by turning them either forward or backward. In my machine this is readily accomplished by moving the hand-lever so as to throw the wheels J, from which the feeding devices are driven, out of contact with the ground, leaving them free to be turned. In order that the attendant may readily turn the wheels J when thus raised from the ground, I provide the shaft F with a pulley, i, and pass a cord or belt, j, from said pulley to a second pulley, k, mounted on the rear edge of the driver's seat l, as shown. If it is found that the machine is not dropping at the proper points, the attendant throws the hand-lever P forward, thereby raising the runners and the wheels J. He then grasps the cord j, and thereby turns the wheels until the parts are brought in position to drop at the required point, after which the hand-lever is thrown backward, depressing wheels J and the runners to an operative position.

The amount of corn deposited at each discharge is regulated by the thickness of the feed-slide. In order that the machine may be adapted to deposit a greater or less amount at will, I provide a series of interchangeable slides, differing from each other only in thickness. When a thin slide is used in place of a thick one, it is necessary to supply additional means to fill the slide opening or seat, and I therefore provide a series of removable plates, S, such as shown in Fig. 7. Each slide, except the one having the greatest thickness, will be used with a corresponding series of plates, S, each slide and its plate having an aggregate thickness equal to the thickness of the heaviest slide used. The plates S are flanged at the ends, and are introduced beneath the feed-slide in the manner shown in Fig. 5, being held down in place by the slide, and being prevented from moving endwise by the flanges or lips on their ends.

The construction of the cut-off devices D used in the feed-hoppers is clearly shown in Figs. 5 and 6. Each device consists of an inside bar or plate and of a grooved cap-plate fitting over and around the same in such manner as to clasp firmly the leather, rubber, bristles, or other yielding materials which may be placed between them, in such manner as to bear upon the upper face of the slide to brush the surplus corn therefrom without danger of breaking or crushing the same. The two parts of the cut-off are constructed in the form shown, and are united and secured in place by means of two vertical bolts passed through them into the base-plate H.

As a means of removing the adhering earth from the wheels J, I attach scrapers m to a rock-shaft, n, the latter provided with a crank-arm, o, connected to an operating rod or handle, p, which extends forward within reach of the driver. This rod p rests upon the cross-shaft N, and is provided with a lip, q, which engages against the shaft to hold the rod forward or back, according as it is desired to hold the scrapers in or out of action. The box or bearing in which the crank-shaft e is mounted is provided with an oil-opening in its top. This opening is closed by means of a slide cap or cover engaging with a dovetail rib on the bearing, and provided with an encircling band, r, of leather or other elastic material, which covers and closes the oil-opening. The opening is exposed by sliding the cap backward.

The machine may be provided, as shown, with a reversible marker, consisting of a pivoted arm, B'', provided with a marking-wheel, and pivoted to a saddle or plate on top of the main frame. The forward truck, E, is connected with the frame by means of a king-bolt and vertical anti-friction rollers, as shown, these devices forming the subject of a separate application.

The machine operates as follows: As it is drawn forward the runners a enter the ground and open furrows therein. The reciprocating slide K discharges the corn at regular intervals and in graduated quantities from the hoppers I, through the runners, into the furrows. The wheels J, following immediately after and in line with the runners, force the earth from one side into the furrows, cover the corn, and compact the earth with the proper degree of firmness thereon.

I am aware that a machine provided with carrying-wheels has been provided with loose upwardly-extending arms carrying gravitating runners at their forward ends, and this I do not claim.

Having thus described my invention, what I claim is—

1. In a seed-planter, the main frame provided with traction-wheels C, in combination with the levers D, having covering-wheels applied to one end, and the furrow-opening runners applied to the opposite end, and means, substantially as described, for adjusting and fixing the position of the levers.

2. In a corn-planter provided with traction-wheels, levers pivoted to the frame and provided with furrow-closing wheels and furrow-opening runners located upon opposite ends of said levers, whereby the runners are raised as the covering-wheels are depressed, and vice versa.

3. The combination of the runners, levers D, covering-wheels J, and traction-wheels C, substantially as described.

4. In combination with the dropping mechanism, wheels J for operating the same, and means, substantially as described, for lifting wheels J clear of the ground, the cord or belt extended forward, substantially as described, to enable the driver to adjust the dropping mechanism as required.

5. The combination of the frame, the wheels J and C, the levers D, and lever P, and connecting devices, substantially as shown, between the lever and the runners.

6. In a corn-planter, the combination of a feed mechanism, traction-wheels adapted to operate the same, means for elevating the traction-wheels from the ground, the pulleys i and k, and an intermediate belt extending forward from one pulley to the other within reach of the attendant, substantially as described, whereby the attendant is enabled to adjust the automatic dropping-gear to discharge at the proper point in the ground.

7. The combination of a feed-hopper and the interchangeable slides and corresponding removable plates S, whereby the discharge may be increased or diminished.

8. In combination with a feed-hopper, a removable feed-slide, and detachable feed-regulating plate S, having flanged ends to retain it in position, as shown.

9. In combination with a feed-slide, a hopper, the cut-off consisting of the inside bar, the elastic material applied thereto, the cap-plate embracing the bar and the elastic material, and the bolts or fastenings arranged to secure the bar and the cap in position, as shown.

10. The combination, on a cut-off, of the inside bar, the elastic material, the cover, cap, or plate, and the bolts passed vertically through the cap and the bar, as shown and described.

11. The combination of the runner, the hand-lever, and the intermediate connection with the fixed rack Q, and the pinion R', and locking-slide R, mounted upon the hand-lever, as shown.

12. The combination of plate Q, lever P, pinion R, locking-slide R', spring $f$, and cap $h$.

13. In combination with the oil-opening, the sliding cap or cover therefor, seated and arranged to slide upon a rib, and provided with an elastic band, $r$, surrounding it, as shown and described.

14. In combination with the main frame and traction-wheels mounted on journals fixed to the main frame, the levers D, mounted concentrically with wheels J, the furrow-opening runners and feed-hoppers mounted upon said levers, and the driving-gear connecting the feed-slide and wheels J, substantially as shown.

THOMAS B. ELLIS.

Witnesses:
P. T. DODGE,
ROBT. L. MILLER.